United States Patent
Bao et al.

(10) Patent No.: US 11,682,905 B2
(45) Date of Patent: *Jun. 20, 2023

(54) PHOTOVOLTAIC POWER PLANT AND SECONDARY FREQUENCY MODULATION CONTROL METHOD THEREFOR

(71) Applicant: BEIJING GOLDWIND SCIENCE & CREATION WINDPOWER EQUIPMENT CO., LTD., Beijing (CN)

(72) Inventors: Xianwen Bao, Beijing (CN); Yuan Qiao, Beijing (CN); Yi Zhang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 407 days.

This patent is subject to a terminal disclaimer.

(21) Appl. No.: 16/616,959

(22) PCT Filed: May 10, 2018

(86) PCT No.: PCT/CN2018/086351
§ 371 (c)(1),
(2) Date: Nov. 25, 2019

(87) PCT Pub. No.: WO2019/128037
PCT Pub. Date: Jul. 4, 2019

(65) Prior Publication Data
US 2020/0259333 A1    Aug. 13, 2020

(30) Foreign Application Priority Data
Dec. 31, 2017  (CN) .......................... 201711497115.6

(51) Int. Cl.
H02J 3/38  (2006.01)
H02J 3/48  (2006.01)
H02J 3/46  (2006.01)

(52) U.S. Cl.
CPC ................ *H02J 3/38* (2013.01); *H02J 3/381* (2013.01); *H02J 3/466* (2020.01); *H02J 3/48* (2013.01);
(Continued)

(58) Field of Classification Search
CPC .......... H02J 13/00019; H02J 3/16; H02J 3/24; H02J 3/38–50; H02J 2300/22–26;
(Continued)

(56) References Cited

U.S. PATENT DOCUMENTS

2016/0099572 A1    4/2016  Gupta et al.
2018/0073486 A1*   3/2018  Zhang ..................... F03D 7/048

FOREIGN PATENT DOCUMENTS

CN    102427244 A    4/2012
CN    103928940 A    7/2014
(Continued)

OTHER PUBLICATIONS

X. Huang, K. Wang and G. Li, "Virtual Inertia Based Control of Two-stage Photovoltaic Inverters for Frequency Regulation in Islanded Micro-grid," 2018 IEEE Power & Energy Society General Meeting (PESGM), 2018, pp. 1-5, doi: 10.1109/PESGM.2018.8586544. (Year: 2018).*

(Continued)

*Primary Examiner* — Elim Ortiz
(74) *Attorney, Agent, or Firm* — Bayes PLLC (57) ABSTRACT

A photovoltaic power plant and a secondary frequency modulation control method therefor are disclosed. The photovoltaic power plant includes a photovoltaic power station and an active power control system, wherein the photovol- (Continued)

taic power station includes a photovoltaic array and a photovoltaic inverter, the photovoltaic inverter being used for converting direct-current electric energy generated by the photovoltaic array into alternating-current electric energy; and the active power control system is used for performing power allocation on the photovoltaic inverter based on a power control AGC instruction value when running data of the photovoltaic power plant meets a pre-set secondary frequency modulation condition, and adjusting an active power output from the photovoltaic inverter based on an AGC instruction value of the photovoltaic inverter subjected to power allocation. The photovoltaic power station can improve the accuracy of power control and the stability of a power system.

19 Claims, 4 Drawing Sheets (52) U.S. Cl.
CPC ....... *H02J 2300/24* (2020.01); *H02J 2300/26* (2020.01); *H02J 2300/28* (2020.01)

(58) Field of Classification Search
CPC .. H02J 3/382; H02J 3/383; H02J 3/385; H02J 3/388; H02J 3/46; H02J 3/466; H02J 3/472; H02J 3/00; H02J 7/00; H02J 3/001; H02J 3/003; H02J 3/004; H02J 3/005; H02J 3/007; H02J 3/06; H02J 3/14; H02J 3/381; H02J 2300/00; H02J 2300/20; H02J 2300/24; H02J 2300/25; H02J 2300/40; Y02E 40/30; Y02E 40/70; Y02E 60/00; Y02E 10/00; Y02E 10/50–65; Y04S 10/00; Y04S 10/22; G05F 1/00; H02M 3/00; H02M 7/00; H02M 1/00

USPC ....... 323/906, 234, 282, 272, 274, 207, 225, 323/283, 351, 224, 311, 290; 363/95, 363/131, 78, 97, 13, 132, 144, 17, 18, 34, 363/35, 40, 55, 56.01, 65, 69, 71, 79, 89; 307/82, 24, 80, 151, 52, 63, 77, 81, 129, 307/31, 86, 87, 106, 125, 130, 147, 26, 307/71, 72, 84, 109, 116, 131, 143, 23, 307/25, 29, 43, 44, 49, 62, 64, 66, 78, 85; 320/101, 109, 166, 128, 102, 140, 162, 320/163, 119, 145, 118, 126, 125, 149, 320/148

See application file for complete search history.

(56) References Cited

FOREIGN PATENT DOCUMENTS

| CN | 105449701 | A | | 3/2016 | |
| CN | 107026461 | A | * | 8/2017 | ............... H02J 3/24 |
| CN | 107026461 | A | | 8/2017 | |
| EP | 1275822 | B1 | | 5/2009 | |
| EP | 2790287 | A2 | | 10/2014 | |
| WO | 2016/054412 | A1 | | 4/2016 | |

OTHER PUBLICATIONS

Extended European Search Report issued in corresponding European Application No. EP 18 89 7136, dated May 26, 2020, 13 pages.
International Search Report and Written Opinion in corresponding PCT Application No. PCT/CN2018/086351, dated Aug. 10, 2018, 10 pages.
Duan, Shenpeng et al., "Design and Realization of an Integrated Device with AGE Subsystem for Photovoltaic Power Station", NR Electric Co., Ltd., Nanjin 211102, China, Mar. 2015, 4 pages [with Abstract].
First Office Action issued in corresponding Chinese Application No. 201711497115 6, dated Oct. 9, 2018, 15 pages.

* cited by examiner

PHOTOVOLTAIC POWER PLANT AND SECONDARY FREQUENCY MODULATION CONTROL METHOD THEREFOR

RELATED APPLICATIONS

This application is a national phase of International Application No. PCT/CN2018/086351, titled "PHOTOVOLTAIC POWER PLANT AND SECONDARY FREQUENCY MODULATION CONTROL METHOD THEREFOR", filed on May 10, 2018, which claims priority to Chinese Patent Application No. 201711497115.6 titled "PHOTOVOLTAIC POWER PLANT AND SECONDARY FREQUENCY MODULATION CONTROL METHOD THEREFOR" and filed with the Chinese State Intellectual Property Office on Dec. 31, 2017, both of which are incorporated herein by reference in their entirety.

TECHNICAL FIELD

The present disclosure relates to the field of power control of a power system, and in particular, to a photovoltaic power plant and a method for controlling secondary frequency modulation thereof.

BACKGROUND

With an increasing penetration rate of new energy power generation units, the centralized access of large-scale new energy field stations has brought new challenges to the safe, stable and efficient operation of power systems. In practical operation of the power grid, micro components of the grid frequency, which are small and short changes, are caused in a case that power consumption does not match power supply. The fluctuation of the grid frequency can usually be corrected by the power generation unit adjusting its frequency. Such process is called the primary frequency modulation of the power generation unit. The secondary frequency modulation refers to a frequency modulation method which is used in a case that there is a great change in a load or output power of the power system and the primary frequency modulation cannot restore the frequency to a predetermined range.

Requirements on frequency modulation of a traditional thermal power generation unit are as follows.

For the primary frequency modulation, a response lag time of the thermal power generation unit participating in the primary frequency modulation should be less than 3 seconds, and duration of frequency fluctuation is less than 1 minute.

For the secondary frequency modulation, duration of frequency fluctuation is a few minutes.

In a case that the new energy field station participates in control of the primary frequency modulation of the power system, the photovoltaic power station is required to meet a real-time power-limited demand Namely, an active power outputted from the photovoltaic power station is greater than a lower limit threshold of the active power, so that the new energy field station has reserved power for energy storage.

Generally for such grid demand, modification is made on a basis of an original energy management platform, or the active power is controlled by using the energy management platform. The power control has low accuracy, and the power system has poor stability.

SUMMARY

A photovoltaic power plant and a method for controlling secondary frequency modulation thereof are provided according to embodiments of the present disclosure, improving accuracy of power control and stability of a power system.

According to an aspect of an embodiment of the present disclosure, a photovoltaic power plant is provided. The photovoltaic power plant includes a photovoltaic power station and an active power control system. The photovoltaic power station includes photovoltaic arrays and photovoltaic inverters. The photovoltaic inverters are configured to convert direct-current electrical energy generated by the photovoltaic arrays into alternating-current electrical energy. The active power control system is configured to perform, based on a power control AGC command value, power allocation among the photovoltaic inverters in a case that operating data of the photovoltaic power plant meets a preset condition for secondary frequency modulation, and adjust active power outputted by the photovoltaic inverters based on the photovoltaic inverters' AGC command values after the power allocation.

According to another aspect of an embodiment of the present disclosure, a method for controlling secondary frequency modulation is provided. The method includes: monitoring operating data of a photovoltaic power plant; determining that the operating data of the photovoltaic power plant meets a preset condition for secondary frequency modulation; performing, based on a power control AGC command value, power allocation among the photovoltaic inverters; and adjusting, based on the photovoltaic inverters' AGC command values after the power allocation, active power outputted by the photovoltaic inverters.

Based on the photovoltaic power plant and the method for controlling secondary frequency thereof according to embodiments of the present disclosure, in a case that the photovoltaic power plant meets the condition for secondary frequency modulation, according to the AGC command value issued by the grid, the AGC command value is equally allocated among all non-benchmarks. After equally allocating the AGC command value, output power of the non-benchmarks is adjusted again, thereby achieving benefits. The benefits include but are not limited to: power-limited measurement of the second frequency modulation, which is based on demands of the primary frequency modulation requirement, is optimized; the whole-field power control of the photovoltaic power station has a fast response speed and a high accuracy, and stability of the power system is further improved.

BRIEF DESCRIPTION OF THE DRAWINGS

For clearer illustration of the technical solutions according to embodiments of the present disclosure, hereinafter are briefly described the drawings to be applied in embodiments of the present disclosure or conventional techniques. Other drawings may be obtained by those skilled in the art based on the provided drawings without creative efforts.

DETAILED DESCRIPTION OF THE EMBODIMENTS

Hereafter features of each aspect and exemplary embodiments of the present disclosure are described in detail. To make the object, technical solutions and advantages of the present disclosure clearer, hereinafter the present disclosure is described in detail in conjunction with the drawings and embodiments. It should be appreciated that the specific embodiments are only intended for illustrating the present disclosure instead of limiting the present disclosure. For those skilled in the art, the present disclosure may be implemented without some of the specific details. The following description of the embodiments is only intended to show examples of the present disclosure, so as to facilitate a better understanding of the present disclosure.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

For a better understanding of the present disclosure, hereinafter the embodiments of the present disclosure are described in detail in conjunction with the drawings. It should be noted that the embodiments are not intended to limit the scope of the present disclosure.

Figure 1:
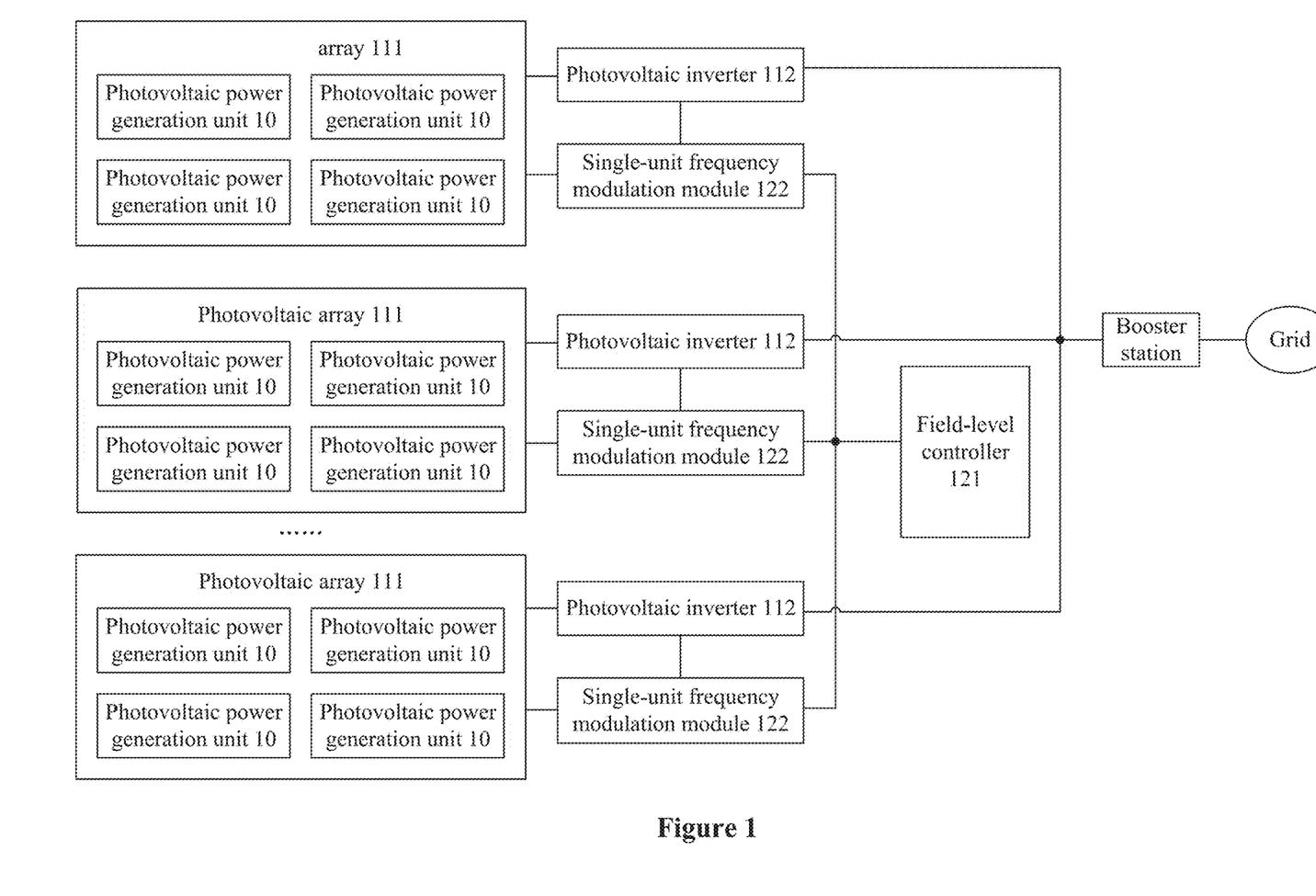
FIG. 1 is a schematic diagram of a frame structure of a photovoltaic power plant according to an embodiment of the present disclosure.

As shown in FIG. 1, according to an embodiment, a photovoltaic power plant may include a photovoltaic power station and an active power control system. The photovoltaic power station includes photovoltaic arrays 111 and photovoltaic inverters 112. The photovoltaic inverters 112 are connected to their respective photovoltaic power generation units 10 in the photovoltaic arrays 111. The photovoltaic inverters 112 are configured to convert direct-current electrical energy generated by the multiple photovoltaic arrays 111 into alternating-current electrical energy. A booster station may be used to boost a voltage of the converted alternating-current electrical energy, and deliver the high-voltage alternating-current electrical energy obtained by the voltage boosting process to a power grid.

The active power control system is configured to, in a case that a frequency at a grid-connection point of the photovoltaic power plant meets a preset triggering condition for primary frequency modulation, determine single-unit active power variation amounts based on the operating state of the photovoltaic inverters 112, and control the photovoltaic power plant to perform the primary frequency modulation. Specifically, the active power outputted by each photovoltaic inverter 112 is adjusted based on the operating state of the photovoltaic inverter.

The active power control system is further configured to perform, based on a power control AGC command value, power allocation on the photovoltaic inverters in a case that the operating data of the photovoltaic power plant meets a preset condition for secondary frequency modulation, and adjust the active power outputted by the photovoltaic inverters based on the photovoltaic inverters' AGC command values after the power allocation.

In the embodiment of the present disclosure, the active power control system adjusts, by using a centralized control scheme, the active power outputted to the entire grid. In a case that requirements on the primary frequency modulation of the photovoltaic power plant are met, the active power outputted from each photovoltaic inverter may be controlled based on the automatic generation control, AGC, command, to achieve the secondary frequency modulation. Whole-field control on the photovoltaic power plant is fast and has a high precision, thereby increasing the stability of the system and improving the grid-connection friendliness of the wind power.

It should be noted that the photovoltaic power plant according to the embodiment of the present disclosure does not include an energy storage apparatus, and the active output of the photovoltaic inverters is controlled by the active power control system.

Reference is further made to FIG. 1. In an embodiment, the active power control system includes a field-level controller 121 and single-unit frequency modulation modules 122.

The field-level controller 121 is configured to perform, based on the AGC command value, the power allocation among the photovoltaic inverters 112 in a case that the operating data of the photovoltaic power plant meets the condition for secondary frequency modulation, and generate a corresponding power adjustment command for photovoltaic inverters 112 which, after the power allocation, meet a preset condition for command value adjustment.

The single-unit frequency modulation modules 122 are connected to their respective photovoltaic inverters 112. The single-unit frequency modulation modules 122 are configured to adjust, based on the AGC command values and the power adjustment command, active power outputted by the photovoltaic inverters 112.

Each single-unit frequency modulation module 122 includes a single-unit communication interface and a photovoltaic controller.

The single-unit communication interface is connected to the field-level controller 121. The single-unit communication interface is configured to receive the AGC command value and the power adjustment command from the field-level controller 121, and send the received AGC command value and the power adjustment command to the corresponding to-be-modulated photovoltaic inverter.

The photovoltaic controller is configured to adjust, based on the AGC command value and the power adjustment command, the active power outputted by the corresponding to-be-modulated photovoltaic inverter according to a preset power adjustment step size and a preset adjustment rate.

Figure 2:
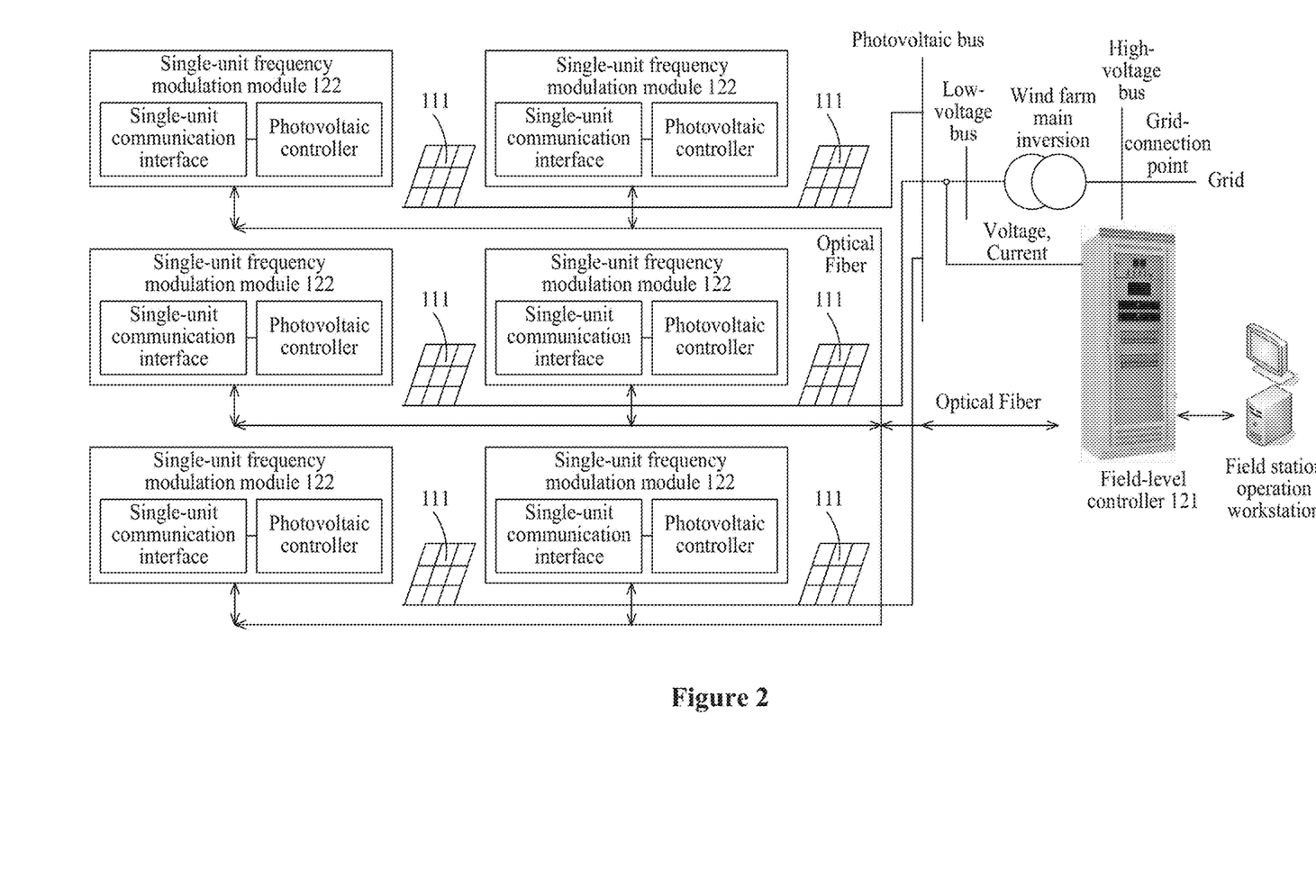
FIG. 2 is a schematic diagram of a topographical structure of a photovoltaic power plant according to an embodiment of the present disclosure.

As shown in FIG. 2, in a photovoltaic power station according to an embodiment, each photovoltaic inverter (not shown in the figure) is connected to a corresponding photovoltaic power generation unit in a photovoltaic array. Each photovoltaic inverter converts direct-current electrical energy generated by the photovoltaic array connected to it into alternating-current electrical energy. The converted alternating-current electrical energy is converged into a photovoltaic bus. The photovoltaic bus transmits, via a cable connected with a low-voltage bus, the alternating-current electrical energy to the low-voltage bus. The low voltage bus is connected, via a booster station, to a high-voltage bus. The alternating-current electrical energy on the low-voltage bus is boosted into alternating-current electrical energy to meet the requirements of the power grid, and is provided to the grid via a grid-connection point on the high-voltage bus.

Reference is further made to FIG. 2. The field-level controller 121 of the active power control system may be connected to each single-unit frequency modulation module 122 via optical fibers. The field-level controller 121 serves as a refined energy management platform, monitors the operating data of the photovoltaic power plant in real time, determines based on the monitored operating data whether the operating data of the photovoltaic power plant meets the preset condition for secondary frequency modulation, allocates single-unit AGC command values reasonably in a case that the preset condition for secondary frequency modulation is met, and sends, through the optical fibers, a single-unit AGC command value and the power adjustment command to each single-unit frequency modulation module 122. Thereby, each single-unit frequency modulation module 122 can quickly respond to the single-unit AGC command value and power adjustment command The photovoltaic inverters participate in power control of the entire photovoltaic power plant to the most extent, which has high responding speed and accuracy to maintain stability of the power system.

In an embodiment of the present disclosure, the condition for secondary frequency modulation of the photovoltaic power plant includes any one of the following conditions:

a difference between a current total power control command value and the last total power control command value is greater than a preset first power-limiting threshold; a time interval between a moment when current power allocation is performed and a moment when last power allocation is performed is greater than a first time threshold; or, a difference between a current total AGC command value and an active power value of the grid-connection point of the photovoltaic power plant is less than a preset second power-limiting threshold, where the total AGC command value is calculated by summing up the single-unit AGC command values for all non-benchmarks.

Figure 3:
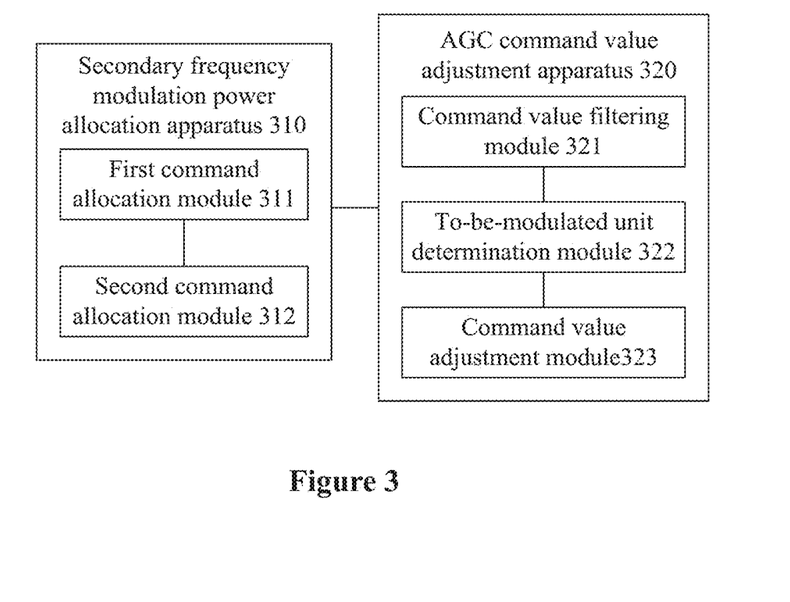
FIG. 3 is a structural schematic diagram of a field-level controller according to an embodiment of the present disclosure.

As shown in FIG. 3, in an embodiment, the field-level controller 121 may include a secondary frequency modulation power allocation apparatus 310 and an AGC command value adjustment apparatus 320.

The secondary frequency modulation power allocation apparatus 310 is configured to select, based on the detected active power outputted by the photovoltaic inverters, a corresponding allocation manner to perform power allocation among the non-benchmarks of the photovoltaic inverters, in a case that the operating data of the photovoltaic power plant meets the preset condition for secondary frequency modulation.

In an embodiment, the secondary frequency modulation power allocation apparatus 310 includes a first command value allocation module 311 and a second command value allocation module 312.

The first command value allocation module 311 is configured to send, in a case that the operating data of the photovoltaic power plant meets a condition for direct allocation of the AGC command value, a first single-unit AGC command value to the non-benchmarks which meet the condition for direct allocation.

In an embodiment, the condition for direct allocation of the command value includes any one of the following conditions: the active power at the grid-connection point of the photovoltaic power plant is less than a preset lower limit threshold of the active power at the grid-connection point; each of the benchmarks of the photovoltaic inverters is at a fault state; or, operating data at the grid-connection point does not meet the condition for secondary frequency modulation.

In an embodiment, in a case that the active power outputted by the entire photovoltaic power plant is less than 10% of rated power of the grid-connection point, the field-level controller 121 directly forwards the single-unit AGC command value from the power grid.

The second command value allocation module 312 is configured to equally allocate single-unit AGC command values for each photovoltaic array based on the single-unit AGC command values of the non-benchmarks, and send a second single-unit AGC command value to non-benchmarks of the photovoltaic inverters which meet a condition for command value delivery.

In one embodiment, the condition for command value delivery includes any one of the following conditions: the first single-unit AGC command value or the second single-unit AGC command value is taken as a single-unit AGC allocation value, and a difference between the single-unit AGC allocation value of the non-benchmarks and a last single-unit AGC allocation value is greater than a preset third power-limiting threshold; a time interval between a current moment and a moment when a last single-unit AGC allocation value is delivered is greater than a first time interval threshold; a difference between the single-unit AGC allocation value and the power value of the non-benchmarks is less than a fourth power-limiting threshold.

In an embodiment, the second command value allocation module 312 is specifically configured to calculate, based on the single-unit AGC command values of the non-benchmarks and a quantity of the non-benchmarks, a total AGC command value of the non-benchmarks of the photovoltaic inverters; equally allocate, based on monitored active power outputted by the benchmarks, the total AGC command value of the non-benchmarks among all the photovoltaic arrays, so as to obtain the AGC command value for each of the photovoltaic arrays; equally allocate the AGC command value obtained for each of the photovoltaic arrays to the photovoltaic power generation units in the photovoltaic array.

As an example, the single-unit AGC command value of the photovoltaic inverters of each photovoltaic array can be calculated based on the following equation.

$$\text{Single-unit } AGC \text{ command value of the photovoltaic inverters} = \\ \text{Active power of benchmark} \times \\ \frac{\text{Sum of } AGC \text{ command values of all non-benchmarks}}{\text{Sum of theorectical power of all non-benchmarks}}$$

The active power of the benchmark represents active power of the benchmark for a photovoltaic array. The sum of the AGC command values of the all non-benchmarks represents a sum of the single-unit AGC command values of all non-benchmarks for the photovoltaic array. The sum of theoretical power of all non-benchmarks represents active power which can theoretically be outputted by the non-benchmarks for the photovoltaic array, with reference to the active power of the benchmark.

For example, the benchmark for the photovoltaic array may operate at full power, and the active power which can be theoretically outputted by a non-benchmark for the photovoltaic array is the full power.

The AGC command value adjustment apparatus 320 is configured to sequentially determine, based on the single-unit AGC command values of the non-benchmarks obtained after the power allocation, whether each non-benchmark meets a preset condition for command value re-adjustment, and generate a power adjustment command to adjust power of the non-benchmark which meets the condition for command value re-adjustment.

In an embodiment, the AGC command value adjustment apparatus 320 may include a command value filtering module 321, a to-be-modulated unit determination module 322, and a command value adjustment module 323.

The command value filtering module 321 is configured to traverse all the single-unit AGC command values of the non-benchmarks of the photovoltaic inverters, and determine a minimum single-unit AGC command value and a maximum single-unit AGC command value among the single-unit AGC command values.

The to-be-modulated unit determination module 322 is configured to determine a non-benchmark having the minimum single-unit AGC command value and a non-benchmark having the maximum single-unit AGC command value as to-be-modulated photovoltaic inverters, respectively, in a case that the minimum single-unit AGC command value is less than a preset lower limit threshold of unit active power, and the maximum single-unit AGC command value is greater than the lower limit threshold of the unit active power.

As an example, all the single-unit AGC command values of the non-benchmarks of all the photovoltaic inverters are traversed. In a case that the minimum single-unit AGC command value is less than 10% of Pn and the maximum single-unit AGC command value is greater than 10% of Pn, it is indicated that the non-benchmarks of the photovoltaic inverters meet the condition for re-adjusting the AGC command values.

The command value adjustment module 323 is configured to perform, based on the generated power adjustment command, command value adjustment steps on the to-be-modulated photovoltaic inverters, until the times of traversing reach a preset times threshold or the single-unit AGC command values of all of the non-benchmarks are all greater than the lower limit threshold of the unit active power.

In an embodiment, the command value adjustment steps may include following steps: increasing the single-unit AGC command value of the to-be-modulated photovoltaic inverter to the lower limit threshold of the unit active power, and acquiring an increasing amount; decreasing the non-benchmark having the maximum AGC command value by a decreasing amount equal to the increasing amount.

As an example, the single-unit AGC command value of the photovoltaic inverter having the minimum AGC command value may be increased to 10% of Pn, and that with the maximum single-unit AGC command value is decreased by the same amount. The AGC command values of all units are repeatedly traversed, and the re-adjustment is stopped in a case that the times N of the above traversal process reaches half of the quantity of photovoltaic inverters, or the single-unit AGC command value of each photovoltaic inverter is greater than 10% of Pn. By adjusting the AGC command values of all of the photovoltaic inverters, the photovoltaic inverters participating in the primary frequency modulation of the power system are as many as possible.

In an embodiment of the present disclosure, the photovoltaic inverters 112 may include benchmarks and non-benchmarks. The benchmarks of the photovoltaic inverters are selected according to a preset selection method. The selection method includes the following steps:

for each group of the photovoltaic inverters, one of photovoltaic inverters which have similar geographical locations and the same output capacity is selected as the benchmark for the other inverters in the group connected to photovoltaic generators. The benchmark is configured to operate at the rated power of the photovoltaic inverter.

Figure 4:
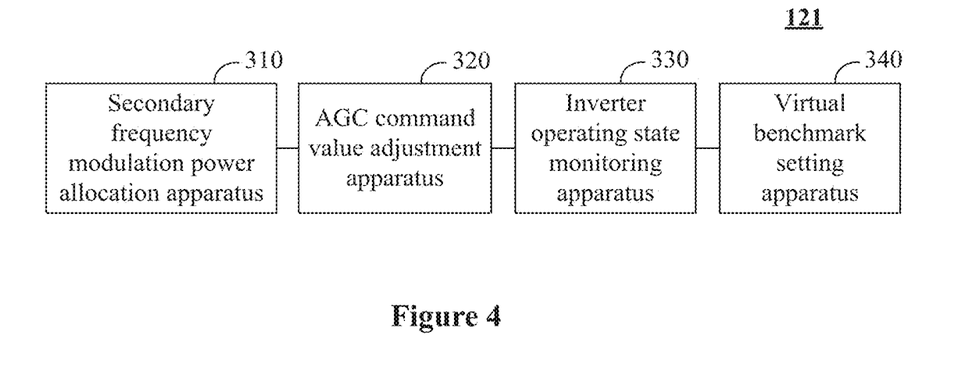
FIG. 4 is a structural schematic diagram of a photovoltaic power plant according to another embodiment of the present disclosure.

As shown in FIG. 4, according to an embodiment, the field-level controller 121 may further include an inverter operating state monitoring apparatus 330 and a virtual benchmark setting apparatus 340.

The inverter operating state monitoring apparatus 330 is configured to determine, based on a preset condition of fault-free operation, whether the operating state of the benchmarks of the photovoltaic inverters is normal, and determine a benchmark at an abnormal operating state as a fault benchmark.

The virtual benchmark setting apparatus 340 is configured to select, based on preset virtual benchmark selection steps, a corresponding virtual benchmark for the photovoltaic inverters corresponding to the fault benchmark as a new benchmark at a normal operating state corresponding to the photovoltaic inverters; and update a quantity of the benchmarks at the normal operating state in real time. The virtual benchmark selection steps include following steps:

obtaining the photovoltaic inverter connected to the fault benchmark, measuring the active power outputted by the photovoltaic inverter to acquire a first active power measurement value; selecting an effective benchmark with active power greater than the first active power measurement value from the benchmarks at the normal operating state as a virtual benchmark.

In an embodiment, a control system for field station frequency modulation further includes a power changing rate control apparatus. The power changing rate control apparatus is configured to, when the primary frequency modulation is performed on the photovoltaic power plant, adjust the power of the photovoltaic power plant based on a predetermined first adjustment rate and a predetermined first adjustment step size, in a case that the photovoltaic power plant meets a latching superimposition operating condition of the primary frequency modulation and the secondary frequency modulation, and an increment of the active power at the grid-connection point of the photovoltaic power plant is greater than the lower limit threshold of the active power at the grid-connection point; and adjust the power of the photovoltaic power plant based on a predetermined second adjustment rate and a predetermined second adjustment step size, in a case that the total AGC command value of the non-benchmarks of multiple photovoltaic inverters is less than the lower limit threshold of the active power at the grid-connection point.

As an example, the AGC command may be a secondary frequency modulation command A target value for controlling the active power at the grid-connection point of the photovoltaic power plant is as follows. An increment of active power of frequency offsets and an increment of active power of the current AGC command are continuously superimposed on the basis of an original value of the active power of the photovoltaic power plant. In a case that the grid frequency is within a permitted range for frequency variation at the grid-connection point, the target value for controlling the active power at the grid-connection point should be an algebra sum of the AGC command value and an adjustment amount of fast frequency response. In a case that the grid frequency is not within the permitted range for frequency variation at the grid-connection point, an increment of active power of the last AGC command is maintained, while the increment of active power of the current AGC command is not superimposed.

Namely, a function of fast frequency response of the photovoltaic power plant should be coordinated with AGC control. In a case that the grid frequency is not within the frequency dead zone but is within 50±0.1 Hz, a target value for controlling the active power of the new energy field station should be an algebra sum of the AGC command value and the adjustment amount of the fast frequency response. In a case that the grid frequency is not within 50±0.1 Hz, the fast frequency response of the new energy latches the AGC reverse adjustment command.

An example of being less than 0.1 Hz is as follows. It is assumed that the grid frequency dead zone is ±0.06 Hz, a current frequency is 50.08 Hz, and the whole field participates in the primary frequency modulation of the system, where DeltP=−500 kW. During this period, a first assumption is that a secondary frequency modulation command requires that power of the whole field is increased from 30,000 kW to 30,500 kW. In such case, the total power performed by the whole field is 30500−500=30000. A second assumption is that the second frequency modulation command requires that the power of the whole field is changed from 30000 kW to 29500 kw, the total power performed by the whole field is 29500−500=29000 kW. (Namely, it is the algebraic sum regardless of directions of the primary frequency modulation and secondary frequency modulation.)

An example of being greater than 0.1 Hz is as follows. It is assumed that the grid frequency dead zone is ±0.06 Hz, a current frequency is 50.12 Hz, and the whole field participates in the primary frequency modulation of the system, where DeltP=−1500 kW. During this period, a first assumption is that a secondary frequency modulation command requires that power of the whole field is increased from 30,000 kW to 30,500 kW. In such case, the total power performed by the whole field is 30000−1500=28500. A second assumption is that the second frequency modulation command requires that the power of the whole field is changed from 30000 kW to 29500 kW, the total power performed by the whole field is 29500−1500=28000 kW. (Namely, a latching logic of the primary frequency modulation and the secondary frequency modulation is: adding in case of the same direction and latching in case of opposite directions).

As an example, during latching superimposition of the primary frequency modulation and the secondary frequency modulation of the photovoltaic power plant, the active power of the inverter may be increased with a step size of 10% of Pn per second, in a case that the increment of the active power at the grid-connection point of the photovoltaic power plant is greater than 10% of the rated power of the whole field. As an example, the increment value of the active power of the inverter is delivered according to a preset control strategy period, in a case that the active power command value at the grid-connection point of the photovoltaic power plant is less than 10% of Pn.

In the embodiment of the present disclosure, the quantity and power state of the benchmarks are refreshed in real time. In a case that the photovoltaic power plant meets the condition for secondary frequency modulation, according to the AGC command value issued by the grid, the AGC command value is equally allocated to each non-benchmark. After equally allocating the AGC command value, the AGC command values of all the non-benchmarks are traversed, and the output power of the non-benchmarks is adjusted. Thereby, power-limited measurement of the secondary frequency modulation, which is based on the primary frequency modulation requirement, is optimized. The whole-field power control of the photovoltaic power station has a fast response speed and high precision, which further improves stability of the power system.

Figure 5:
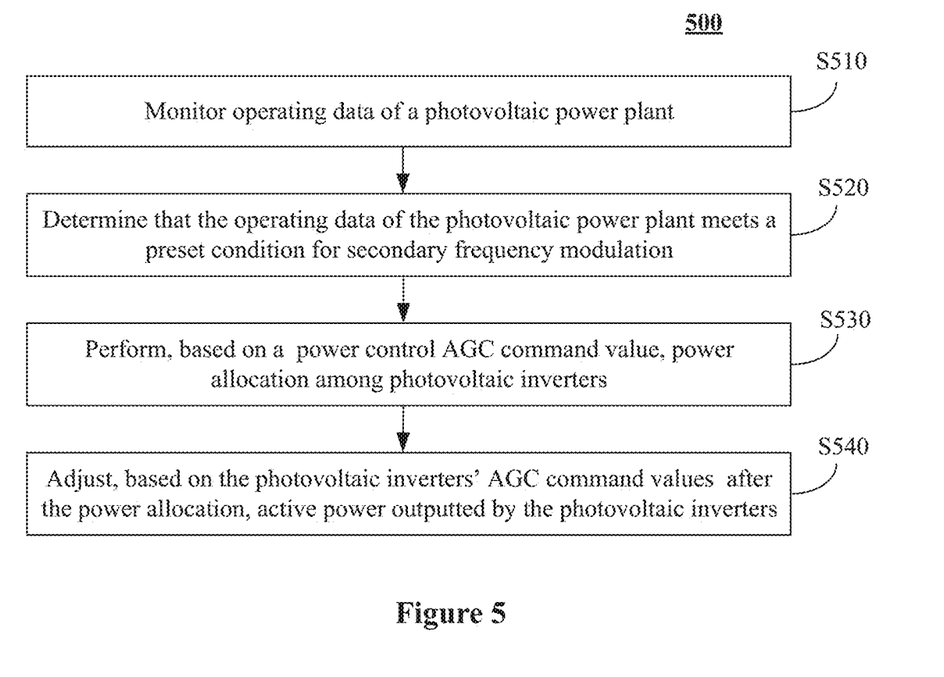
FIG. 5 is a flowchart of a method for controlling secondary frequency modulation according to an embodiment of the present disclosure.

As shown in FIG. 5, a method 500 for controlling secondary frequency modulation according to an embodiment of the present disclosure includes the steps S510 to S540.

In step S510, operating data of a photovoltaic power plant is monitored.

In step S520, it is determined that the operating data of the photovoltaic power plant meets a preset condition for secondary frequency modulation.

In step S530, power allocation is performed, based on a power control AGC command value, among photovoltaic inverters.

In step S540, active power outputted by the photovoltaic inverters is adjusted based on the photovoltaic inverters' AGC command value after the power allocation.

According to an embodiment, the step S530 may specifically include step S531 and step S532.

In step S531, a corresponding allocation manner is selected based on the detected active power outputted by the photovoltaic inverters, to perform the power allocation among non-benchmarks of the photovoltaic inverters.

According to an embodiment, the step S531 may specifically include step S531-01 and step S531-02.

In step S531-01, in a case that the operating data of the photovoltaic power plant meets a condition for direct allocation of the AGC command value, a corresponding first single-unit AGC command value is sent to the non-benchmarks which meet the condition for direct allocation.

In step S531-02, single-unit AGC command values are equally allocated, based on the single-unit AGC command values of the non-benchmarks, for each of the photovoltaic arrays, and a second single-unit AGC command value is sent to the non-benchmarks of the photovoltaic inverters which meet a condition for command value delivery.

Specifically, a total AGC command value of the non-benchmarks of the photovoltaic inverters is calculated based on the single-unit AGC command values of the non-benchmarks and a quantity of the non-benchmarks.

The total AGC command value of the non-benchmarks is equally allocated among all of the photovoltaic arrays, based on monitored active power outputted by benchmarks, and an AGC command value is obtained for each photovoltaic array.

The AGC command value obtained for each photovoltaic array is allocated equally, according to the selected allocation manner, to photovoltaic power generation units in the photovoltaic array.

In step S532, it is sequentially determined, based on the AGC command value of each non-benchmark obtained after the power allocation, whether each non-benchmark meets a preset condition for command value re-adjustment, and a power adjustment command is generated to perform power adjustment on the non-benchmarks which meet the condition for command value re-adjustment.

According to an embodiment, the step of adjusting the power of the non-benchmarks which meet the condition for command value re-adjustment in the step S532 may specifically include steps S532-01 to S533-03.

In step S532-01, the single-unit AGC command values of the non-benchmarks of the photovoltaic inverters are traversed, and a minimum single-unit AGC command value and a maximum single-unit AGC command value are determined among the single-unit AGC command values.

In step S533-02, in a case that the minimum single-unit AGC command value is less than a preset lower limit threshold of unit active power and the maximum single-unit AGC command value is greater than the lower limit threshold of unit active power, a non-benchmark having the minimum single-unit AGC command value and a non-benchmark having the maximum single-unit AGC command value are respectively determined as to-be-modulated photovoltaic inverters.

Step S533-03, command value adjustment steps are performed, based on the generated power adjustment command, on the to-be-modulated photovoltaic inverters, until the times of traversing reach a preset times threshold or the single-unit AGC command values of all of the non-benchmarks are all greater than the lower limit threshold of unit active power.

Specifically, the command value adjustment steps performed on the to-be-modulated photovoltaic inverters in step S533-03 may include the following step.

The command value adjustment steps are performed, based on the generated power adjustment command, on the to-be-modulated photovoltaic inverters, until the traversal times reaches the preset times threshold or single-unit command values of all of the non-benchmarks are all greater than the lower limit threshold of unit active power.

In the embodiment of the present disclosure, the benchmarks of the photovoltaic inverters are selected according to a preset selection method. The selection method includes step S01 and step S02.

In step S01, multiple groups of the photovoltaic inverters are acquired, and photovoltaic inverters with similar geographical locations and the same output capacity are selected from each of the multiple groups.

In step S02, a photovoltaic inverter is chosen as a benchmark from the selected photovoltaic inverters, the photovoltaic inverters other than the benchmark, in the group, serve as the non-benchmarks, and the benchmark is configured to operate according to rated power of the photovoltaic inverters.

In one embodiment, operating data of the benchmarks, such as an effective quantity of the benchmarks and power of the benchmarks, are refreshed in real time, so as to allocate the single-unit AGC command values.

In the embodiment of the present disclosure, the AGC command value is allocated with reference to the active power outputted by the benchmarks. The operating state of the benchmarks can be determined in real time for accuracy of allocation of the AGC command In a case that a benchmark has a communication failure or a system failure, it is required to substitute the marked unit with a virtual benchmark. The principle of substitution of the virtual benchmark is as follows. A unit, whose power is slightly higher than measured power of the marked unit, is selected from the remaining benchmarks as the virtual benchmark for the group.

It is determined, based on a preset condition of fault-free operation, whether the operating state of the benchmark of the photovoltaic inverters is normal, and the benchmark at an abnormal operating state is determined as a fault benchmark.

A corresponding virtual benchmark is selected for the photovoltaic inverters corresponding to the fault benchmark as a new benchmark at a normal operating state corresponding to the photovoltaic inverters, based on preset virtual benchmark selection steps. The quantity of the benchmarks at the normal operating state is updated in real time. The virtual benchmark selection steps include following steps.

The photovoltaic inverter connected to the fault benchmark is obtained. The active power outputted by the photovoltaic inverter is measured to acquire a first active power measurement value. An effective benchmark with active power greater than the first active power measurement value is selected from the benchmarks at the normal operating state as the virtual benchmark.

As an example, during latching superimposition of the primary frequency modulation and the secondary frequency modulation AGC command, the active power may be increased with a step size of 10% of Pn per second, in a case that the increment of the active power is greater than 10% of the rated power of the whole photovoltaic power plant. The increment value of the active power is delivered according to a control strategy period, in a case that the active power command value is less than 10% of Pn.

Other details of the apparatus according to an embodiment of the present disclosure are similar to the method according to an embodiment of the present disclosure which is described above in conjunction with FIG. 1, and are not described herein again.

The above embodiments may be implemented in whole or in part by software, hardware, firmware, or any combination thereof. In case of being implemented in software, it may be implemented in whole or in part in the form of a computer program product or a computer readable storage medium. The computer program product or the computer readable storage medium includes one or more computer instructions. In a case that the computer program instructions are loaded and executed on a computer, the processes or functions described according to the embodiments of the present disclosure are generated in whole or in part. The computer may be a general computer, a special computer, a computer network, or other programmable apparatuses. The computer instructions may be stored in a computer readable storage medium or transferred from one computer readable storage medium to another computer readable storage medium. For example, the computer instructions can be transferred from a website, a computer, a server or a data center to another website, another computer, another server or another data center via a wired manner (such as a coaxial cable, an optical fiber, and a digital subscriber line, DSL) or a wireless manner (such as infrared, wireless, microwave, and the like). The computer readable storage medium may be any available media that can be accessed by a computer, or a data storage device, such as a server and a data center, which includes one or more integrated available media. The available media may be a magnetic medium (such as a floppy disk, a hard disk, a magnetic tape), an optical medium (such as a DVD), or a semiconductor medium (such as a solid state disk Solid State Disk, SSD) or the like.

It is noted that the present disclosure is not limited to the specific configurations and processes described hereinabove and illustrated in the drawings. For clarity, a detailed description of conventional methods is omitted herein. In the above embodiments, several specific steps have been described and illustrated as examples. The method and process according to the present disclosure is not limited to the specific steps which are described and illustrated. Those skilled in the art appreciating the spirit of the present disclosure can make various changes, modifications, and supplementations, or change the order of the steps.

Hereinabove described are only specific embodiments of the present disclosure. Those skilled in the art can clearly understand that, for the convenience and clarity and concise of the description, specific operating processes of systems, modules and units described above can refer to corresponding processes of the foregoing method embodiments, and are not repeatedly described herein. It should be understood that the scope of the present disclosure is not limited thereto. Various equivalent modifications or substitutions within the technical scope of the present disclosure may be easily conceived by those skilled in the art. The modifications or substitutions are within the protection scope of the present disclosure.

The invention claimed is:

1. A photovoltaic power plant, comprising:
   a photovoltaic power station comprising photovoltaic arrays and photovoltaic inverters, wherein the photovoltaic inverters are configured to convert direct-current electrical energy generated by the photovoltaic arrays into alternating-current electrical energy; and
   an active power control system configured to:
      perform, based on a power control automatic generation control (AGC) command value, power allocation among the photovoltaic inverters responsive to operating data of the photovoltaic power plant meeting a preset condition for performing a secondary frequency modulation process, wherein the secondary frequency modulation process is applied responsive to a primary frequency modulation process failing to restore a power grid frequency to a predetermined range; and
      adjust active power outputted by the photovoltaic inverters based on AGC command values of the photovoltaic inverters after the power allocation, wherein the active power control system comprises:
      a field-level controller configured to generate a power adjustment command for one or more of the photovoltaic inverters which meet a preset condition for command value adjustment after the power allocation; and
      single-unit frequency modulation modules connected to the photovoltaic inverters, each of the single-unit frequency modulation modules connected to a respective photovoltaic inverter and comprising:
         a photovoltaic controller configured to adjust, based on a corresponding AGC command value of the respective photovoltaic inverter and the power adjustment command, active power outputted by the respective photovoltaic inverter which is to be modulated according to a preset power adjustment step size and a preset adjustment rate.

2. The photovoltaic power plant according to claim 1, wherein:
   the field-level controller is configured to perform, based on the power control AGC command value, the power allocation among the photovoltaic inverters responsive to the operating data of the photovoltaic power plant meeting the condition for performing the secondary frequency modulation process; and
   the single-unit frequency modulation modules are configured to adjust, based on the AGC command values of the photovoltaic inverters and the power adjustment command, the active power outputted by the photovoltaic inverters.

3. The photovoltaic power plant according to claim 2, wherein each of the single-unit frequency modulation modules connected to the respective photovoltaic inverter further comprises:
   a single-unit communication interface, connected to the field-level controller, and configured to receive the corresponding AGC command value of the respective photovoltaic inverter and the power adjustment command from the field-level controller, and send the received corresponding AGC command value and the power adjustment command to the respective photovoltaic inverter which is to be modulated.

4. The photovoltaic power plant according to claim 1, wherein the field-level controller comprises:
   a secondary frequency modulation power allocation apparatus, configured to select, based on detected active power outputted by the photovoltaic inverters, a corresponding allocation manner to perform power allocation among non-benchmark members of the photovoltaic inverters, responsive to the operating data of the photovoltaic power plant meeting the preset condition for performing the secondary frequency modulation process; and
   an AGC command value adjustment apparatus, configured to sequentially determine, based on single-unit AGC command values of the non-benchmark members obtained after the power allocation, whether each of the non-benchmark members meets a preset condition for command value re-adjustment, and generate a power adjustment command to perform power adjustment on one of the non-benchmark members which meets the preset condition for command value re-adjustment.

5. The photovoltaic power plant according to claim 4, wherein the secondary frequency modulation power allocation apparatus comprises:
   a first command value allocation module, configured to send a first single-unit AGC command value to ones of the non-benchmark members which meet a condition for direct allocation, responsive to the operating data of the photovoltaic power plant meeting the condition for direct allocation; and
   a second command value allocation module, configured to equally allocate single-unit AGC command values for each of the photovoltaic arrays based on single-unit AGC command values of the non-benchmark members, and send a second single-unit AGC command value to ones of the non-benchmark members of the photovoltaic inverters which meet a condition for command value delivery.

6. The photovoltaic power plant according to claim 5, wherein the second command value allocation module is configured to:
   calculate, based on the single-unit AGC command values of the non-benchmark members and a quantity of the non-benchmark members, a total AGC command value of the non-benchmark members of the photovoltaic inverters;
   equally allocate, based on monitored active power outputted by benchmark members of the photovoltaic inverters, the total AGC command value of the non-benchmark members among all of the photovoltaic arrays, to obtain an AGC command value for each of the photovoltaic arrays; and
   equally allocate the AGC command value obtained for each of the photovoltaic arrays to photovoltaic power generation units in the photovoltaic array.

7. The photovoltaic power plant according to claim 4, wherein the AGC command value adjustment apparatus comprises:
   a command value filtering module, configured to traverse the single-unit AGC command values of the non-benchmark members of the photovoltaic inverters, and determine a minimum single-unit AGC command value and a maximum single-unit AGC command value among the single-unit AGC command values of the non-benchmark members;

a to-be-modulated unit determination module, configured to determine a non-benchmark member having the minimum single-unit AGC command value and another non-benchmark member having the maximum single-unit AGC command value as to-be-modulated photovoltaic inverters, responsive to the minimum single-unit AGC command value being less than a preset lower limit threshold of unit active power and the maximum single-unit AGC command value being greater than the lower limit threshold of the unit active power; and a command value adjustment module, configured to perform, based on the generated power adjustment command, a command value adjustment step on the to-be-modulated photovoltaic inverters, until a number of times of traversing reaches a preset threshold or the single-unit AGC command values of all of the non-benchmark members are all greater than the lower limit threshold of the unit active power.

8. The photovoltaic power plant according to claim 7, wherein the command value adjustment step comprises:

increasing the single-unit AGC command value of the non-benchmark member having the minimum single-unit AGC command value to the lower limit threshold of the unit active power;

acquiring an increasing amount from the minimum single-unit AGC command value to the lower limit threshold of the unit active power; and decreasing, by a decreasing amount equal to the increasing amount, the single-unit AGC command value of the non-benchmark member having the maximum single-unit AGC command value.

9. The photovoltaic power plant according to claim 4, wherein benchmark members of the photovoltaic inverters are selected according to a preset selection method comprising:

dividing the photovoltaic inverters into a plurality of groups of photovoltaic inverters; and for each group of the photovoltaic inverters,
selecting photovoltaic inverters which have geographical locations within a distance range and an identical output capacity from the group; and
choosing one of the selected photovoltaic inverters as a benchmark member for other photovoltaic inverters in the group connected to photovoltaic generators, wherein the benchmark member is configured to operate at rated power of the photovoltaic inverters, and the other photovoltaic inverters in the group are non-benchmark members.

10. The photovoltaic power plant according to claim 4, wherein the field-level controller further comprises:

an inverter operating state monitoring apparatus, configured to determine, based on a preset condition of fault-free operation, whether an operating state of benchmark members of the photovoltaic inverters is normal, and determine one of the benchmark members at an abnormal operating state as a faulty benchmark member; and a virtual benchmark setting apparatus, configured to select, based on a preset virtual benchmark selection step, a corresponding virtual benchmark member for photovoltaic inverters corresponding to the faulty benchmark member as a new benchmark member at a normal operating state corresponding to the photovoltaic inverters, and updating a quantity of the benchmark members at the normal operating state in real time.

11. The photovoltaic power plant according to claim 2, wherein the field-level controller further comprises a power changing rate control apparatus configured to:

when a primary frequency modulation process is performed on the photovoltaic power plant, adjust power of the photovoltaic power plant based on a predetermined first adjustment rate and a predetermined first adjustment step size, responsive to the photovoltaic power plant meeting a latching superimposition operating condition of the primary frequency modulation process and the secondary frequency modulation process and an increasing amount of active power at a grid-connection point of the photovoltaic power plant being greater than a lower limit threshold of the active power at the grid-connection point; and adjust the power of the photovoltaic power plant based on a predetermined second adjustment rate and a predetermined second adjustment step size, responsive to a total AGC command value of non-benchmark members of the photovoltaic inverters being less than the lower limit threshold of the active power at the grid-connection point.

12. A method for controlling a secondary frequency modulation process of a photovoltaic power plant, comprising:

monitoring operating data of the photovoltaic power plant;

determining that the operating data of the photovoltaic power plant meets a preset condition for performing the secondary frequency modulation process, wherein the secondary frequency modulation process is applied responsive to a primary frequency modulation process failing to restore a power grid frequency to a predetermined range;

performing, based on a power control automatic generation control (AGC) command value, power allocation among photovoltaic inverters in the photovoltaic power plant; and adjusting, based on AGC command values of the photovoltaic inverters after the power allocation, active power outputted by the photovoltaic inverters, wherein performing based on the power control AGC command value, the power allocation among the photovoltaic inverters comprises:

selecting, based on detected active power outputted by the photovoltaic inverters, a corresponding allocation manner to perform the power allocation among non-benchmark members of the photovoltaic inverters; and determining sequentially, based on a corresponding AGC command value of each of the non-benchmark members obtained after the power allocation, whether each of the non-benchmark members meets a preset condition for command value re-adjustment and generating a power adjustment command to perform power adjustment on one of the non-benchmark members which meets the preset condition for command value re-adjustment.

13. The method according to claim 12, wherein selecting, based on the detected active power outputted by the photovoltaic inverters, the corresponding allocation manner to perform the power allocation among the non-benchmark members of the photovoltaic inverters comprises:

sending a first single-unit AGC command value to ones of the non-benchmark members which meet a condition for direct allocation, responsive to the operating data of the photovoltaic power plant meeting the condition for direct allocation; and allocating, based on single-unit AGC command values of the non-benchmark members, the single-unit AGC command values equally for each of the photovoltaic arrays, and sending a second single-unit AGC command value to ones of the non-benchmark members of the photovoltaic inverters which meet a condition for command value delivery.

14. The method according to claim 13, wherein allocating, based on the single-unit AGC command values of the non-benchmark members, the single-unit AGC command values equally for each of the photovoltaic arrays, and sending the second single-unit AGC command value to the ones of the non-benchmark members of the photovoltaic inverters which meet the condition for command value delivery comprises:

calculating, based on the single-unit AGC command values of the non-benchmark members and a quantity of the non-benchmark members, a total AGC command value of the non-benchmark members of the photovoltaic inverters;

allocating, based on monitored active power outputted by benchmark members of the photovoltaic inverters, the total AGC command value of the non-benchmark members equally among all of the photovoltaic arrays to obtain an AGC command value for each of the photovoltaic arrays; and allocating, according to the selected allocation manner, the AGC command value obtained for each of the photovoltaic arrays equally to photovoltaic power generation units in the photovoltaic array.

15. The method according to claim 12, wherein determining sequentially, based on the AGC command value of each of the non-benchmark members obtained after the power allocation, whether each of the non-benchmark members meets the preset condition for command value re-adjustment, and generating the power adjustment command to perform the power adjustment on the one of the non-benchmark members which meets the condition for command value re-adjustment comprises:

traversing single-unit AGC command values of the non-benchmark members of the photovoltaic inverters, and determining a minimum single-unit AGC command value and a maximum single-unit AGC command value among the single-unit AGC command values;

determining a non-benchmark member having the minimum single-unit AGC command value and another non-benchmark member having the maximum single-unit AGC command value as to-be-modulated photovoltaic inverters, responsive to the minimum single-unit AGC command value being less than a preset lower limit threshold of unit active power and the maximum single-unit AGC command value being greater than the lower limit threshold of the unit active power; and performing, based on the generated power adjustment command, a command value adjustment step on the to-be-modulated photovoltaic inverters, until a number of times of traversing reaches a preset threshold or the single-unit AGC command values of all of the non-benchmark members are all greater than the lower limit threshold of the unit active power.

16. The method according to claim 15, wherein performing, based on the generated power adjustment command, the command value adjustment step on the to-be-modulated photovoltaic inverters comprises:

increasing the single-unit AGC command value of the non-benchmark member having the minimum single-unit AGC command value to the lower limit threshold of the unit active power;

acquiring an increasing amount from the minimum single-unit AGC command value to the lower limit threshold of the unit active power; and decreasing, by a decreasing amount equal to the increasing amount, the single-unit AGC command value of the non-benchmark member having the maximum AGC command value.

17. The method according to claim 12, wherein benchmark members of the photovoltaic inverters are selected according to a preset selection method comprising:

dividing the photovoltaic inverters into a plurality of groups of photovoltaic inverters; and for each of the plurality of groups,
selecting, from the group, photovoltaic inverters which have geographical locations within a distance range and an identical output capacity; and choosing one from the selected photovoltaic inverters as a benchmark member for other photovoltaic inverters in the group, wherein the other photovoltaic inverters in the group serve as the non-benchmark members, and the benchmark member is configured to operate according to rated power of the photovoltaic inverters.

18. The method according to claim 12, further comprising:

determining, based on a preset condition of fault-free operation, whether an operating state of benchmark members of the photovoltaic inverters is normal, and determining one of the benchmark members at an abnormal operating state as a faulty benchmark member;

selecting, based on a preset virtual benchmark selection step, a corresponding virtual benchmark member for photovoltaic inverters corresponding to the faulty benchmark as a new benchmark member at a normal operating state corresponding to the photovoltaic inverters; and updating a quantity of the benchmark members at the normal operating state in real time, wherein the virtual benchmark selection step comprises:

obtaining one of the photovoltaic inverters which is connected to the faulty benchmark member;

measuring active power outputted by the one of the photovoltaic inverters to acquire a first active power measurement value; and selecting, from the benchmark members at the normal operating state, an effective benchmark member with active power greater than the first active power measurement value as the virtual benchmark member.

19. The method for according to claim 12, wherein adjusting, based on the AGC command values of the photovoltaic inverters after the power allocation, the active power outputted by the photovoltaic inverters comprises:

when the primary frequency modulation process is performed on the photovoltaic power plant, adjusting power of the photovoltaic power plant based on a predetermined first adjustment rate and a predetermined first adjustment step size, responsive to the photovoltaic power plant meeting a latching superimposition operating condition of the primary frequency modulation process and the secondary frequency modulation process and an increasing amount of active power at a grid-connection point of the photovoltaic power plant being greater than a lower limit threshold of the active power at the grid-connection point; and adjusting the power of the photovoltaic power plant based on a predetermined second adjustment rate and a predetermined second adjustment step size, responsive to a total AGC command value of non-benchmark members of the photovoltaic inverters being less than the lower limit threshold of the active power at the grid-connection point.

* * * * *